United States Patent [19]

Simmons

[11] Patent Number: 5,573,300
[45] Date of Patent: Nov. 12, 1996

[54] UTILITY VEHICLES WITH INTERCHANGEABLE EMERGENCY RESPONSE MODULES

[76] Inventor: Michael C. Simmons, 6306 Debbie Cir., Rowlett, Tex. 75088

[21] Appl. No.: 358,255

[22] Filed: Dec. 19, 1994

[51] Int. Cl.⁶ .................................................. B60P 3/00
[52] U.S. Cl. ...................... 296/197; 169/24; 280/DIG. 5; 296/19
[58] Field of Search ..................... 296/196, 197, 296/19, 37.6, 35.3; 169/24, 54; 280/DIG. 5, 756; 362/74; 116/147; 180/89.11

[56] References Cited

U.S. PATENT DOCUMENTS

| | | | |
|---|---|---|---|
| 2,704,989 | 3/1955 | Konecny | 296/19 X |
| 3,770,060 | 11/1973 | Forsyth et al. | 169/24 |
| 4,027,739 | 6/1977 | Allenthorp et al. | 180/89.1 |
| 4,225,153 | 9/1980 | Bez et al. | 296/19 X |
| 4,389,066 | 6/1983 | Weir et al. | 296/19 |
| 4,593,855 | 6/1986 | Forsyth | 169/24 X |
| 4,676,545 | 6/1987 | Bonfilio et al. | 296/197 |
| 4,842,326 | 6/1989 | DiVito | 296/196 |
| 5,012,880 | 5/1991 | Abner | 180/89.11 |
| 5,301,997 | 4/1994 | Cudden | 296/183 |

FOREIGN PATENT DOCUMENTS

| | | | |
|---|---|---|---|
| 2741126 | 3/1979 | Germany | 296/19 |
| 675459 | 7/1952 | United Kingdom | 296/196 |

Primary Examiner—David M. Mitchell
Assistant Examiner—Kia M. Robinson
Attorney, Agent, or Firm—Konneker & Smith

[57] ABSTRACT

A utility vehicle with emergency response modules. The emergency response vehicle consists of one of a number of small utility vehicles capable of traversing areas and facilities inaccessable to ordinary street vehicles, and one of a number of modules. A major feature of the invention is the manner in which emergency equipment has been provided in separate modules suited for response to particular emergencies such as fire, ambulance, rescue, or tactical operations by law enforcement personnel. A further feature is the interchangeability of one module for another. Another feature is that the modules may be installed on a number of appropriate small utility vehicles.

12 Claims, 2 Drawing Sheets

UTILITY VEHICLES WITH INTERCHANGEABLE EMERGENCY RESPONSE MODULES

CROSS-REFERENCES TO RELATED APPLICATIONS

There are no related applications.

BACKGROUND OF THE INVENTION

A. Field of the Invention

This invention pertains to the fields of art relating to emergency response vehicles and, more particularly, to vehicles especially equipped with various modules to provide essential emergency services in locations having restricted access and/or in areas impassable to normal street vehicles.

B. Description of the Related Art

In an industrial plant, it can be difficult, and at times virtually impossible, to provide emergency services where they are needed most. This situation is primarily due to the small passageways and low overhead clearances which make it impossible for normal street vehicles such as fire trucks, rescue vehicles, and ambulances to get to the emergency.

If a fire breaks out in an industrial plant, automatic fire suppression systems and hand-held fire extinguishers must be relied upon to put it out since there is no way at present to transport and concentrate significant fire fighting equipment at the scene of a fire. If fires break out in parking garages, the low clearance makes it inaccessible to normal fire-fighting vehicles.

If a worker is in a precarious or life-threatening predicament, he or she must be rescued using only that equipment which can be transported to the scene by hand.

If a worker is injured in such an industrial plant, he must be either transported in his injured condition to an emergency facility or treated at the scene of the injury using those first-aid supplies which can be carried to the scene by hand.

Similarly, an emergency situation occuring in mountainous areas, in heavily wooded areas, and/or away from roadways can make it practically impossible to provide emergency services when and where they are needed by normal street emergency vehicles.

Planes have crashed in heavily wooded areas and many hours of valuable time were consumed clearing trees to make a path for rescue vehicles and ambulances. Meanwhile, the injured had to be carried out by hand on stretchers.

Mountain climbers, hikers, and others have become involved in perilous situations in areas which a street vehicle finds impassable. Again, rescue equipment must be carried to the scene by hand, and injured persons must be transported, at least as far as a roadway, by hand.

A fire in a location impassable to a normal fire truck must be put out by whatever means are at hand, or else allowed to burn itself out. On a much larger scale, planes and helicopters carrying fire-suppressing chemicals or large volumes of water are used for such things as forest fires. However, these methods are not practical for the more common building or equipment fire.

In crowded areas such as sports stadiums and amusement parks, it is difficult for a full-size fire truck, rescue vehicle, or ambulance to manuever quickly because large numbers of people must move out of the way to let the vehicle pass.

The following technical references are known to the inventor:

| | United States Patents | |
|---|---|---|
| U.S. Pat. No. | Inventor | Year Issued |
| 4,027,739 | Allenthorp et al. | 1977 |
| 4,676,545 | Bonfilio et al. | 1987 |
| 4,842,326 | DiVito | 1989 |
| 5,012,880 | Abner | 1991 |
| 5,301,997 | Cudden | 1994 |

The Allenthorp patent discloses a camper module for use on a small car chassis for recreational purposes.

The Bonfilio patent discloses a modular chassis and bodies for constructing land, sea, and air vehicles.

The DiVito patent discloses various interchangeable vehicle "cores" for use on roadways to which various modules attach to perform various functions. An ambulance shell is disclosed for use with this vehicle.

The Abner patent discloses a "mini-ambulance" built on a small material transport vehicle. All of the emergency response equipment is separately attached to the vehicle body.

The Cudden patent discloses a modular passenger compartment for a pick-up truck.

Modular vehicle components are well known in the art. See, for example, U.S. Pat. Nos. 4,027,739, 4,676,545, 4,842,326, and 5,301,997 to Allenthorp et al., Bonfilio et al., DeVito, and Cudden respectively. Each of these disclose a vehicle with modular components, or a vehicle which is itself made up of modules.

Such vehicles have several disadvantages. Each patent listed immediately above discloses a full-size vehicle meant for operation on the street. These vehicles are useless for all practical purposes if the emergency happens to be in a restricted, congested, or otherwise impassable area for street vehicles.

U.S. Pat. No. 5,012,880 to Cudden discloses a "mini-ambulance" which can operate in places where a full-size vehicle cannot. This vehicle, however, is only useful for performing certain services on a particular vehicle chassis and body since all of the equipment is attached directly to the vehicle body.

What is needed in the art is a utility vehicle which can perform various emergency response functions depending upon which module is attached to the vehicle, and which is small in size so that it can maneuver in restricted and congested areas, and which is capable of traversing areas inaccessible to vehicles meant for operation on roads. Applicant's present invention fulfills these needs which heretofore have gone unmet.

SUMMARY OF THE INVENTION

The invention is a utility vehicle with emergency response modules, for use in providing emergency services in industrial plants and any other area where it is impractical or impossible for a normal emergency vehicle to go.

More particularly, the invention pertains to a utility vehicle which can provide a variety of emergency response services depending on which module is attached to the vehicle.

In another respect, the invention pertains to an emergency response vehicle which is small enough in size that it can maneuver in confined spaces such as industrial plants and in crowded areas such as amusement parks.

In a further respect, the invention pertains to a vehicle which can transport a variety of emergency response equipment over terrain that cannot be traversed by emergency vehicles designed to be driven on streets.

In another respect, the invention pertains to a number of interchangeable modules each of which is specifically adapted to provide an emergency service.

In a further respect, the invention pertains to a number of interchangeable vehicles which enable an emergency response module to be used on a variety of suitable vehicles.

This invention provides several advantages over previous emergency response vehicles. Each module is specifically designed to provide a particular emergency response service such as fire fighting, rescue, or medical treatment. Little or no modifications need be made to the vehicle body or frame. Each piece of equipment does not have to be separately mounted on the vehicle. The modules are interchangeable, providing for ease of manufacture and allowing an end user to select from among a variety of modules to suit the desired purpose for his or her chosen vehicle. The vehicle chassis is also interchangeable, allowing an end user to select from among a variety of vehicle chassis to transport his or her chosen module. Emergency response modules can be pre-assembled and maintained in inventory until a customer orders an emergency response vehicle and specifies which vehicle chassis is desired. Several acceptable utility vehicles are now commercially-available, such as the CUB CADET utility vehicle, the KAWASAKI MULE, and the JOHN DEERE GATOR vehicle. The modular nature of the emergency response modules enables their use on vehicles which can traverse snow (using a snowmobile or snow-cat vehicle) or water (using an amphibious vehicle) as well.

The present invention solves the problem for those who must fight fires, rescue persons, or provide emergency medical treatment to persons in industrial plants, confined areas, crowded areas, or any areas otherwise inaccessible to normal street vehicles, and makes these emergency response vehicles modular for ease of manufacture, assembly, and distribution.

These and other objects and advantages of the present invention will become more apparent from the description hereinafter.

DESCRIPTION OF THE DRAWINGS

In the drawings, which illustrate embodiments of the present invention.

DESCRIPTION OF THE PREFERRED EMBODIMENTS

Although hereinbelow are described what are at present considered the preferred embodiments of the invention, it will be understood that the invention can be embodied in other specific forms without departing from the spirit or essential characteristics thereof. The present embodiments are, therefore, to be considered in all aspects as illustrative and not restrictive.

Figure 1:
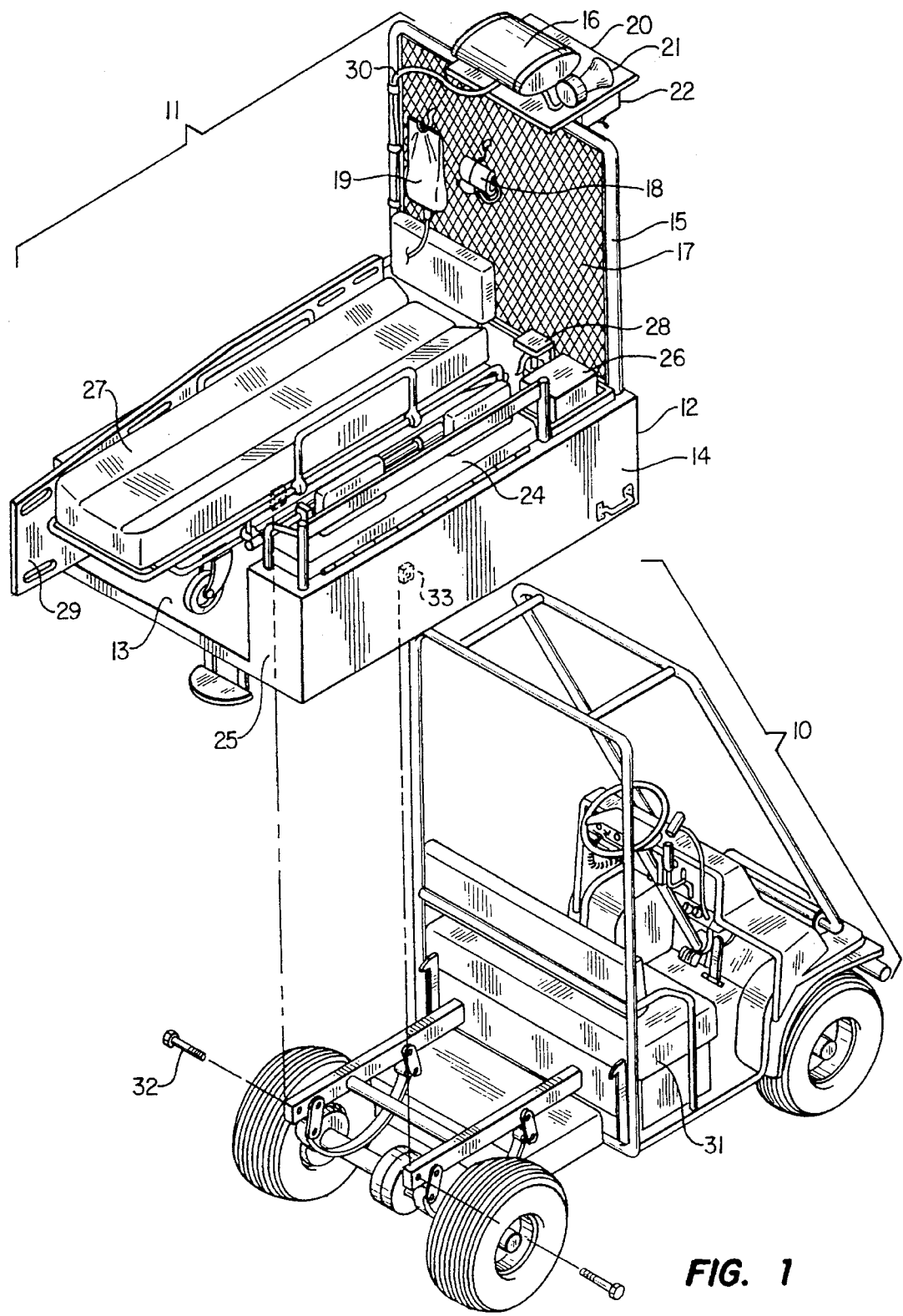
FIG. 1 is an exploded perspective view of an emergency medical treatment module on a utility vehicle, constructed in accordance with the principles of the invention.
Figure 2:
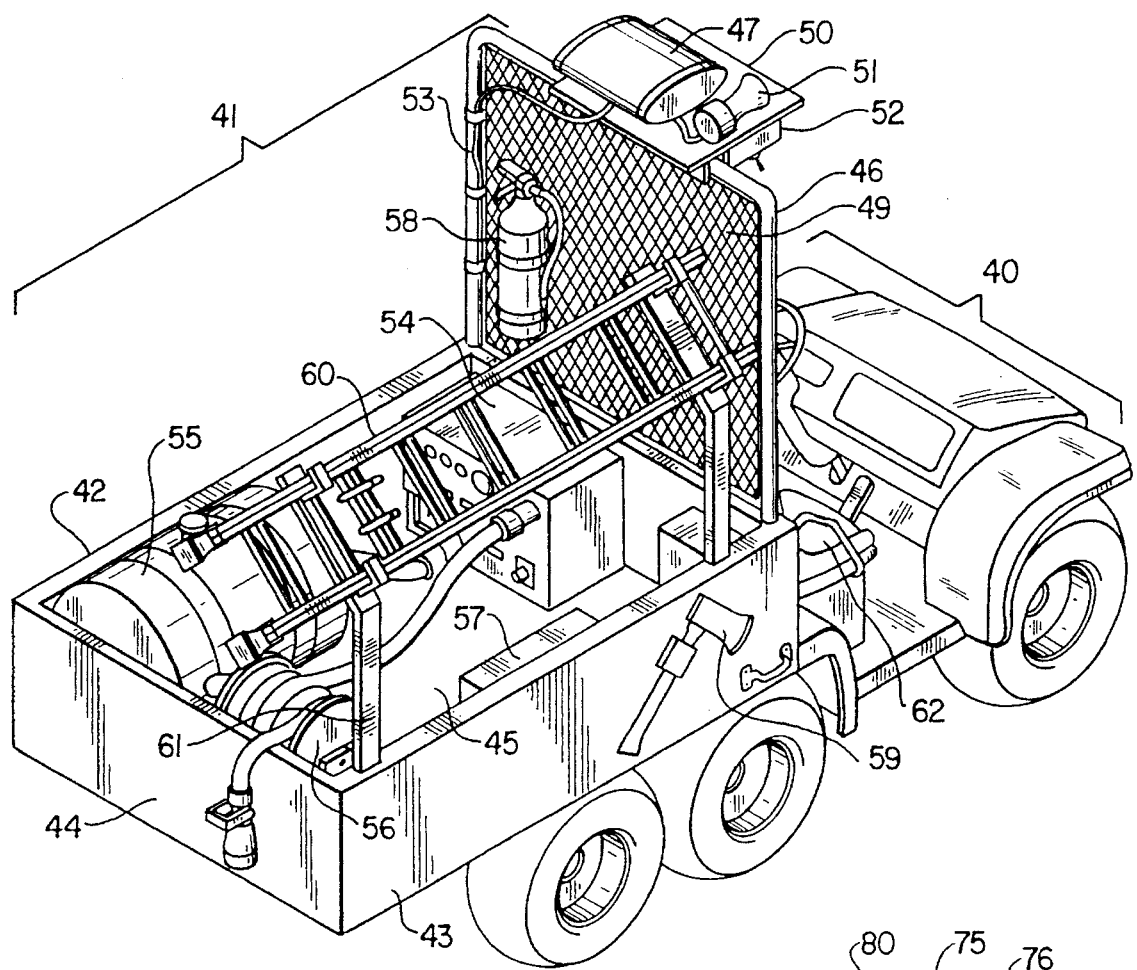
FIG. 2 is a perspective view of another embodiment of the invention, a fire-fighting module on a different utility vehicle.
Figure 3:
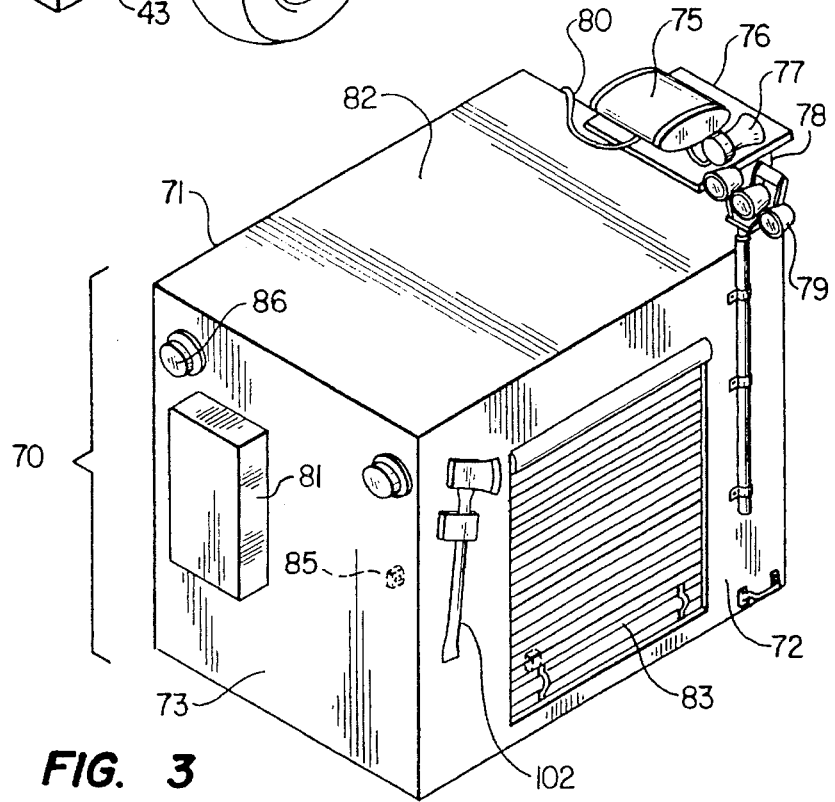
FIG. 3 is a perspective view of another embodiment of the present invention, a module for use in transporting rescue equipment and specialized equipment used by law-enforcement agencies.

Turning now to the drawings, in which similar reference characters denote similar elements throughout several views, FIGS. 1 through 3 illustrate preferred embodiments of the modular emergency response vehicles constituting this invention.

The embodiment shown in FIG. 1 consists of an utility vehicle 10 and an emergency medical treatment module 11. In this embodiment, the utility vehicle 10 is shown as a KAWASAKI MULE. However, it is an object and an advantage of the present invention that the emergency response modules disclosed herein are adaptable to many different vehicles, including, but not limited to, snowmobiles and amphibious vehicles. For purposes of this Patent Specification, utility vehicle shall be defined to include snowmobiles, snow-cats, amphibious vehicles, and other vehicles designed for operation on surfaces other than pavement.

Few, if any, modifications need be made to the modules or the vehicles to make them interchangeable as the modules are completely self-contained, except for the need for a 12 volt power source. Any necessary modifications can be easily performed by one skilled in the art.

The emergency medical treatment module 11 has a metal framework 12 to which a horizontal floor 13 and a plurality of vertical side panels 14 are attached. Extending upward, vertically, from the front of the framework 12 is a light bar 15.

The area encompassed between the light bar 15 and the framework 12 is covered with expanded metal 17 to protect the occupants in the forward seat of the vehicle 31, and to provide a convenient, elevated area on which to hang instruments and supplies used in the treatment of patients during transport. An aneroid sphygmomanometer 18 and an intravenous fluids bag 19 are here shown hanging from the expanded metal 17.

Extending forward, horizontally, from the light bar 15 and perpendicular thereto is a console 20. On the upper surface of the console 20 is mounted a siren 21 and an emergency warning light 16, and on the lower surface of the console 20 are mounted the controls 22 for the siren and various lights in the emergency medical treatment module 11. The controls 22 are thus within easy reach and sight of the operator of the vehicle, as the console 20 extends over the forward seat of the vehicle 31.

Within the module 11, is a bench seat 24 running front-to-back along one side of the module 11 for the person attending to the patient. The bench seat 24 has a hinged seat with a storage compartment 25 (only the exterior of which is shown in the drawing) thereunder for storage of various medical equipment and supplies such as bandages, splints, medicine, etc. A shelf is located just forward of the bench seat 24 onto which is mounted a cardiac defibrillator 26.

Within the module 11, opposite the bench seat 24, and running front-to-back along the other side of the module 11 is a patient cot 27. An oxygen cylinder and bracket therefor 28 are mounted to the module floor 13, between the bench seat 24 and the patient cot 27. Between the patient cot 27 and the closest side panel 14 is an immobilizing back board 29.

The only electrical connection to the vehicle 10 from the module 11 is a power cord 30. The mechanical connection between the vehicle 10 and the module 11 is made by simply bolting them together using a plurality of bolts 32 through a plurality of attachment points 33. Other acceptable methods include welding, hinging, etc.

The embodiment shown in FIG. 2 consists of a utility vehicle 40 and a fire-fighting module 41. The vehicle shown is a JOHN DEERE GATOR model 6×4. This module 41 is also mountable on the KAWASAKI MULE vehicle 10, or a CUB CADET utility vehicle. The various modules and vehicles are interchangeable.

The framework 42 of the fire-fighting module 41 is the same as for the emergency medical treatment module 11. Side panels 43 are the same also, except that there is an additional panel 44 at the back of the module 41 to prevent items from rolling out of the back of the module 41. A floor 45 is also provided.

Extending upward, vertically, from the front of the framework 42 is a light bar 46. The area encompassed between the light bar 46 and the framework 42 is covered with expanded metal 49 to protect the occupants in the forward seat 62 of the vehicle.

Extending forward, horizontally, from the light bar 46 and perpendicular thereto is a console 50. On the upper surface of the console 50 is mounted a siren 51 and emergency warning light 47, and on the lower surface of the console 50 are mounted the controls 52 for the siren and various lights in the fire-fighting module 41. The controls 52 are thus within easy reach and sight of the operator of the vehicle, as the console 50 extends over the forward seat of the vehicle 62.

Within the module 41 and attached to the floor 45 are a compressed air foam extinguishing system 54, water tank 55, and a hose reel with hose and fire nozzle 56. A storage compartment 57 for storage of helmets, suits, etc. is provided in the floor 45 forward of the hose reel 56. A fire extinguisher 58 is also mounted in the module 41.

A fire axe 59 is mounted to a side panel 43 for convenient access. A ladder rack 61 extends upward, vertically, from the framework 42 on one side, and a ladder 60 is mounted thereon.

The only electrical connection to the vehicle 40 from the module 41 is a power cord 53. The mechanical connection between the vehicle 40 and the module 41 is made by simply bolting them together using a plurality of bolts through a plurality of attachment points as shown in the previous drawing. Other acceptable methods include welding, hinging, etc.

Turning, now, to FIG. 3, the embodiment shown is an emergency rescue module 70 which can be installed on various types of vehicles and can also be used for storage of tactical equipment for use by law enforcement personnel. The framework 71 is in the shape of a rectangular box with a floor and panels 72, 73, 82. Mounted on a side panel 72 are area lights 79.

Extending horizontally forward from the top panel 82 is a console 76 on the upper surface of which is mounted a siren 77 and emergency warning light 75. On the lower side of the console 76 is a control panel 78 with instruments and switches to control the siren 77, emergency warning lights 75 & 86, and area lights 79. A plurality of other emergency warning lights 86 are mounted on the back panel 73. The control panel 78 is thus conveniently mounted to be within easy sight and reach of the vehicle operator.

A fire ax 102 is mounted on the side panels 72. On the back panel 73, are mounted two self-contained breathing apparatuses SCBA's 81. The SCBA's 81 are on the outside of the module 70 so that they my be easily transferred to the back of a rescue worker. A roll-up door 83 is located in one side panel 72 to provide access to the interior of the module 70.

In the interior of the module 70 is room for storage of various equipment frequently needed for rescue operations. A hydraulic rescue tool, a confined space rescue tripod, an axe, a fire extinguisher, a generator, a portable work light, and a rope are examples of equipment that may be stored in the module 70.

The only electrical connection between the emergency rescue module 70 and any vehicle it may be attached to, is a power cord 80. The mechanical connection between a vehicle and the module 70 is made by simply bolting them together using a plurality of bolts through a plurality of attachment points 85. Other acceptable methods include welding, hinging, etc.

Although both vehicles shown in the drawings have four driven wheels, a four wheel drive vehicle is not a necessary element of the present invention.

Experience and experimentation have led applicant to the conclusion that a vehicle having a width of less than 70 inches, a length of less than 120 inches, and a height of less than 90 inches is necessary to obtain sufficient maneuverability in confined or crowded areas.

The manner of usage and operation of the invention described above being readily apparent from the above disclosure, no further discussion relative to the manner of usage and operation of the invention shall be provided.

With respect to the above description, it is to be understood that the optimum dimensional relationships for the parts of the invention, as well as variations in size, materials, shape, form, function, and manner of operation, assembly, and use, and equivalents of all the foregoing, are apparent to one skilled in the art. Such equivalents are intended to be encompassed by the present invention.

Therefore, the foregoing is considered as illustrative only of the principles of the invention. Further, since numerous modifications and changes will be readily apparent to those skilled in the art, it is not intended to limit the invention to the exact construction and operation shown and described, but to encompass all suitable modifications and equivalents within the scope of the invention.

The scope of the invention is indicated by the appended claims rather than by the foregoing description.

I claim:

1. Apparatus for use in responding to emergencies, comprising:

a) a small utility vehicle having a chassis, engine and drivetrain, driver's seat, and a body;

b) a module having a structural framework defining an enclosure separate from said small utility vehicle;

c) a plurality of equipment for use in response to a particular type of emergency disposed within and on said module;

d) means for joining said module framework to said small utility vehicle chassis; and e) a console, said console including a siren, emergency warning light, and a control panel for controlling said siren and said emergency warning light, said console being attached to a forward portion of said module framework and extending generally orthogonally and forwardly therefrom and vertically overlying said vehicle driver's seat, whereby, said module may be conveniently joined to said module such that said console extends over said driver's seat for controlling said siren and said emergency warning light.

2. Apparatus for use in responding to emergencies according to claim 1, wherein said small utility vehicle has a width of less than 70 inches, a length of less than 120 inches, and a height of less than 90 inches.

3. Apparatus for use in responding to emergencies according to claim 1, wherein said equipment for use in response to a particular type of emergency is equipment for fire fighting.

4. Apparatus for use in responding to emergencies according to claim 3, wherein said equipment for fire fighting comprises:
   a) means for extinguishing fire;
   b) an emergency warning light;
   c) a siren;
   d) a control panel; and
   e) a storage compartment.

5. Apparatus for use in responding to emergencies according to claim 4, wherein said means for extinguishing fire comprises:
   a) a compressed air foam extinguishing system;
   b) a water tank;
   c) a hose reel, including a hose and a fire nozzle;
   d) a fire extinguisher;
   e) a ladder; and
   f) an axe.

6. Apparatus for use in responding to emergencies according to claim 1, wherein said equipment for use in response to a particular type of emergency is equipment for rescue of persons and tactical operations by law enforcement personnel.

7. Apparatus for use in responding to emergencies according to claim 6, wherein said equipment for rescue of persons and tactical operations by law enforcement personnel comprises:
   a) means for rescuing persons and tactical operations;
   b) an emergency warning light;
   c) an area light;
   d) a siren;
   e) a control panel; and
   f) a storage compartment.

8. Apparatus for use in responding to emergencies according to claim 7, wherein said means for rescuing persons and tactical operations comprises:
   a) a hydraulic rescue tool;
   b) a confined space rescue tripod;
   c) an axe;
   d) a fire extinguisher;
   e) a generator;
   f) a portable work light;
   g) a rope; and
   h) a self-contained breathing apparatus.

9. Apparatus for use in responding to emergencies according to claim 1, wherein said equipment for use in response to a particular type of emergency is equipment for provision of emergency medical treatment.

10. Apparatus for use in responding to emergencies according to claim 9, wherein said equipment for provision of emergency medical treatment comprises:
    a) means for treating sick and injured persons; and
    b) a storage compartment.

11. Apparatus for use in responding to emergencies according to claim 10, wherein said means for treating sick and injured persons comprises:
    a) a cardiac defibrillator;
    b) an aneroid sphygmomanometer;
    c) an intravenous fluid delivery means;
    d) an oxygen cylinder and bracket therefor;
    e) a patient cot and fastener therefor;
    f) a back board; and
    g) a plurality of medical supplies.

12. A module for attachment to a selected one of a plurality of small utility vehicles, each of the small utility vehicles having a rearward chassis and a forward driver's area, and the driver's area having a driver's seat mounted thereon, the module comprising:
    a generally rectangular framework having a floor, at least two generally vertical sides, a generally vertical light bar having a generally horizontal portion, and mounting portions on a bottom side surface of said framework, said framework being adapted for attachment to a selected one of the small utility vehicles at said mounting portions;
    a console mounted to said light bar, said console including an emergency light, a siren, and a control panel, said control panel facing downwardly from said console, and said console projecting forwardly from said generally horizontal portion of said light bar; and
    a plurality of equipment mounted to said framework, said equipment including devices for use in an emergency.

* * * * *